(12) United States Patent
Kim et al.

(10) Patent No.: US 10,993,239 B2
(45) Date of Patent: Apr. 27, 2021

(54) METHOD FOR PERFORMING HARQ PROCEDURE IN ENVIRONMENT OPERATING IN FDR MODE AND APPARATUS THEREFOR

(71) Applicant: LG ELECTRONICS INC., Seoul (KR)

(72) Inventors: Dongkyu Kim, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 16/309,415

(22) PCT Filed: Jul. 29, 2016

(86) PCT No.: PCT/KR2016/008329
§ 371 (c)(1),
(2) Date: Dec. 12, 2018

(87) PCT Pub. No.: WO2017/217584
PCT Pub. Date: Dec. 21, 2017

(65) Prior Publication Data
US 2019/0335471 A1    Oct. 31, 2019

Related U.S. Application Data

(60) Provisional application No. 62/348,957, filed on Jun. 12, 2016.

(51) Int. Cl.
*H04W 72/08* (2009.01)
*H04L 5/00* (2006.01)
(Continued)

(52) U.S. Cl.
CPC ......... *H04W 72/082* (2013.01); *H04L 1/0003* (2013.01); *H04L 1/1819* (2013.01);
(Continued)

(58) Field of Classification Search
CPC ...... H04W 72/082; H04L 5/0048; H04L 5/14; H04L 1/0003; H04L 1/1819;
(Continued)

(56) References Cited

U.S. PATENT DOCUMENTS

| 8,503,364 B2 | 8/2013 | Zhang et al. |
| 8,995,377 B2 | 3/2015 | Wang et al. |

(Continued)

FOREIGN PATENT DOCUMENTS

| WO | WO2014092365 A1 * | 6/2014 |
| WO | WO 2015/105208 A1 | 7/2015 |

(Continued)

OTHER PUBLICATIONS

Nokia et al., "Non-anchor PRB location for NB-IoT multi-carrier operation," 3GPP TSG-RAN WG1 Meeting #85, R1-165002, Nanjing, China, May 23-27, 2016, 2 pages.

(Continued)

*Primary Examiner* — Shailendra Kumar
(74) *Attorney, Agent, or Firm* — Birch, Stewart, Kolasch & Birch, LLP

(57) ABSTRACT

A method for performing a Hybrid Automatic Repeat request (HARQ) procedure by a terminal operating in an FDR mode in a wireless communication system comprises the steps of: receiving a downlink signal from a base station; and transmitting feedback information including a NACK signal for the downlink signal to the base station, wherein the feedback information may further include an indicator (Continued)

indicating that the reason for transmitting the NACK signal is that the terminal has failed to remove a self-interference signal.

10 Claims, 18 Drawing Sheets

(51) Int. Cl.
    *H04L 5/14*           (2006.01)
    *H04L 1/00*           (2006.01)
    *H04L 1/18*           (2006.01)
    *H04L 5/16*           (2006.01)

(52) U.S. Cl.
    CPC .......... *H04L 5/0048* (2013.01); *H04L 5/0055* (2013.01); *H04L 5/14* (2013.01); *H04L 5/1461* (2013.01); *H04L 5/16* (2013.01)

(58) Field of Classification Search
    CPC ....... H04L 5/0055; H04L 5/1461; H04L 5/16; H04L 5/0053; H04L 5/00
    See application file for complete search history.

(56) References Cited

U.S. PATENT DOCUMENTS

| | | | |
|---|---|---|---|
| 9,014,065 B2 | 4/2015 | Yang et al. | |
| 9,236,996 B2 | 1/2016 | Khandani | |
| 9,397,814 B2 | 7/2016 | Yang et al. | |
| 9,414,373 B2 | 8/2016 | Park et al. | |
| 9,467,993 B2 | 10/2016 | Seo | |
| 9,686,056 B2 | 6/2017 | Wang et al. | |
| 9,756,625 B2 | 9/2017 | Liu et al. | |
| 9,825,752 B2 | 11/2017 | Jindal et al. | |
| 9,838,193 B2 | 12/2017 | Kazmi et al. | |
| 9,872,303 B2 | 1/2018 | Suzuki et al. | |
| 9,949,265 B2 | 4/2018 | Dinan | |
| 10,033,428 B2 | 7/2018 | Liu | |
| 10,103,788 B2 | 10/2018 | Liu | |
| 10,110,265 B2 | 10/2018 | Sesia et al. | |
| 10,355,899 B2 | 7/2019 | Wang et al. | |
| 10,383,105 B2 | 8/2019 | Byun et al. | |
| 10,484,040 B2 | 11/2019 | Lim et al. | |
| 10,491,260 B2 | 11/2019 | Kim et al. | |
| 10,505,680 B2 | 12/2019 | Marinier et al. | |
| 10,560,229 B2 | 2/2020 | Xiong et al. | |
| 10,567,147 B2 | 2/2020 | DiFazio et al. | |
| 2013/0044621 A1* | 2/2013 | Jung | H04L 5/0007 370/252 |
| 2013/0195041 A1* | 8/2013 | Papasakellariou | H04L 1/0038 370/329 |
| 2013/0250869 A1* | 9/2013 | Eriksson | H04W 72/1231 370/329 |
| 2013/0273834 A1 | 10/2013 | Sundstrom et al. | |
| 2013/0301593 A1 | 11/2013 | Gaal et al. | |
| 2014/0066114 A1* | 3/2014 | Kwon | H04L 1/1819 455/501 |
| 2015/0098401 A1 | 4/2015 | Park et al. | |
| 2015/0109969 A1 | 4/2015 | Celebi et al. | |
| 2015/0280887 A1* | 10/2015 | Ko | H04B 7/2621 370/330 |
| 2016/0014727 A1* | 1/2016 | Nimbalker | H04W 72/042 370/329 |
| 2016/0073391 A1* | 3/2016 | Awad | H04L 1/1864 370/329 |
| 2016/0127030 A1 | 5/2016 | Kim et al. | |
| 2016/0127936 A1 | 5/2016 | Chatterjee et al. | |
| 2016/0234003 A1 | 8/2016 | Wang et al. | |
| 2016/0234829 A1 | 8/2016 | Takahashi et al. | |
| 2016/0337108 A1 | 11/2016 | Choi et al. | |
| 2017/0302337 A1* | 10/2017 | Liu | H04B 7/005 |
| 2017/0339667 A1 | 11/2017 | Shen et al. | |
| 2018/0097607 A1* | 4/2018 | Ji | H04L 5/14 |
| 2018/0159643 A1 | 6/2018 | Huang et al. | |
| 2019/0190636 A1 | 6/2019 | Kim et al. | |
| 2019/0253224 A1* | 8/2019 | Sun | H04W 74/08 |
| 2019/0335471 A1 | 10/2019 | Kim et al. | |

FOREIGN PATENT DOCUMENTS

| | | |
|---|---|---|
| WO | WO 2015/134907 A1 | 9/2015 |
| WO | WO 2015/147571 A1 | 10/2015 |
| WO | WO 2015/160333 A1 | 10/2015 |
| WO | WO 2015/178640 A1 | 11/2015 |

OTHER PUBLICATIONS

Nokia Networks et al., "NB-IoT Operation in Multiple PRBs," 3GPP TSG RAN WG1 Meeting #84, R1-160447, St. Julian's, Malta, Feb. 15-19, 2016, 6 pages.

\* cited by examiner

METHOD FOR PERFORMING HARQ PROCEDURE IN ENVIRONMENT OPERATING IN FDR MODE AND APPARATUS THEREFOR

CROSS REFERENCE TO RELATED APPLICATIONS

This application is the National Phase of PCT International Application No. PCT/KR2016/008329, filed on Jul. 29, 2016, which claims priority under 35 U.S.C. 119(e) to U.S. Provisional Application No. 62/348,957, filed on Jun. 12, 2016, all of which are hereby expressly incorporated by reference into the present application.

TECHNICAL FIELD

The present invention relates to a wireless communication system, and more particularly, to a method of performing a HARQ procedure in environment operating in a FDR mode and an apparatus therefor.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

In 5G communication system, an operation in a FDR (Full Duplex Radio) mode is supported. However, a self-interference occurs due to the operation of the FDR mode and the self-interference deteriorates communication performance. Hence, it is necessary to have a solution for the self-interference issue.

DISCLOSURE OF THE INVENTION

Technical Tasks

A technical task of the present invention is to provide a method for a UE operating in a FDR mode to perform a HARQ procedure in a wireless communication system.

Another technical task of the present invention is to provide a method for a base station to perform a HARQ procedure in a wireless communication system.

The other technical task of the present invention is to provide a UE performing a HARQ procedure in a FDR mode in a wireless communication system.

The other technical task of the present invention is to provide a base station performing a HARQ procedure in a wireless communication system supporting a FDR mode.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for performing a HARQ (Hybrid Automatic Repeat reQuest) procedure by a user equipment (UE) operating in a FDR (Full Duplex Radio) mode in a wireless communication system, includes the steps of receiving a downlink signal from a base station and transmitting feedback information including an NACK signal to the base station in response to the downlink signal. In this case, the feedback information can further include an indicator indicating that the NACK signal is transmitted because the UE has failed in cancelling of a self-interference signal.

Alternatively, the feedback information can further include information indicating a sub-band, a PRB (Physical Resource Block), or an RBG (Resource Block Group) where the UE has failed in the cancelling of the self-interference signal.

Alternatively, the feedback information can further include information indicating an RBG (Resource Block Group) where the UE has recently succeeded in the cancelling of the self-interference signal.

Alternatively, the feedback information can further include information on an MCS (Modulation and Coding Scheme) level preferred by the UE. In this case, the MCS level can be determined based on strength of a residual self-interference signal after the self-interference signal is cancelled.

To further achieve these and other advantages and in accordance with the purpose of the present invention, according to a different embodiment, a method for performing a HARQ procedure by a base station in a wireless communication system, includes the steps of transmitting a downlink signal to a user equipment (UE) operating in a FDR (Full Duplex Radio) mode and receiving feedback information including a NACK signal for the downlink signal from the UE. In this case, the feedback information can further include an indicator indicating that the NACK signal is transmitted because the UE has failed in cancelling of a self-interference signal.

The method can further include the step of retransmitting the downlink signal to the UE based on the feedback information. In this case, a chase combining scheme can be applied to the retransmitted downlink signal.

The method can further include the step of retransmitting the downlink signal to the UE based on the feedback information. In this case, an RV (Redundancy Version) value applied to the retransmitted downlink signal may be identical to an RV value applied to a previously transmitted downlink signal.

The method can further include the step of transmitting downlink control information including the RV value applied to the retransmitted downlink signal to the UE.

The method can further include the step of transmitting downlink control information including information indicating the UE to operate in a half-duplex mode to the UE based on the feedback information.

The method can further include the steps of transmitting downlink control information indicating the UE to discard the downlink signal and receive new data to the UE based on the feedback information and transmitting the new data to the UE based on the downlink control information.

To further achieve these and other advantages and in accordance with the purpose of the present invention, according to a further different embodiment, a user equipment (UE) for performing a HARQ (Hybrid Automatic Repeat reQuest) procedure in a FDR (Full Duplex Radio) mode in a wireless communication system includes a receiver, a transmitter, and a processor, the processor configured to control the receiver to receive a downlink signal from a base station, the processor configured to control the transmitter to transmit feedback information including an NACK signal to the base station in response to the downlink signal. In this case, the feedback information can further include an indicator indicating that the NACK signal is transmitted because the UE has failed in cancelling of a self-interference signal.

To further achieve these and other advantages and in accordance with the purpose of the present invention, according to a further different embodiment, a base station for performing a HARQ procedure in a wireless communication system supporting a FDR (Frequency Duplex Radio) mode includes a transmitter, a receiver, and a processor, the processor configured to control the transmitter to transmit a downlink signal to a user equipment (UE) operating in a FDR (Full Duplex Radio) mode, the processor configured to control the receiver to receive feedback information including a NACK signal for the downlink signal from the UE. In this case, the feedback information can further include an indicator indicating that the NACK signal is transmitted because the UE has failed in cancelling of a self-interference signal.

Advantageous Effects

According to one embodiment of the present invention, when a retransmission is requested in a FDR system, it is able to increase a success rate of the retransmission by transmitting information on whether or not a UE supporting a FDR mode has canceled a self-interference to a base station.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
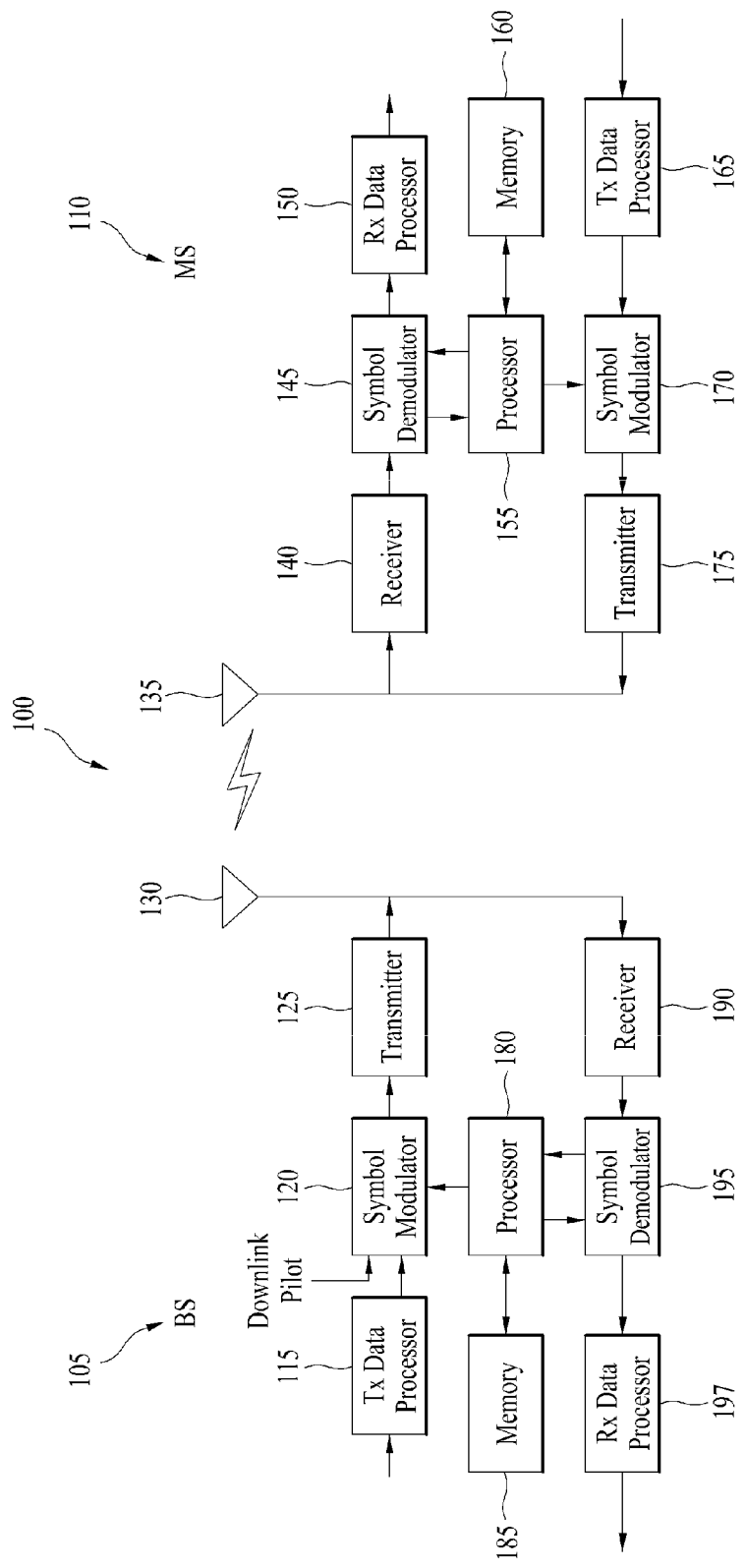
FIG. 1 is a block diagram illustrating configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Figure 2:
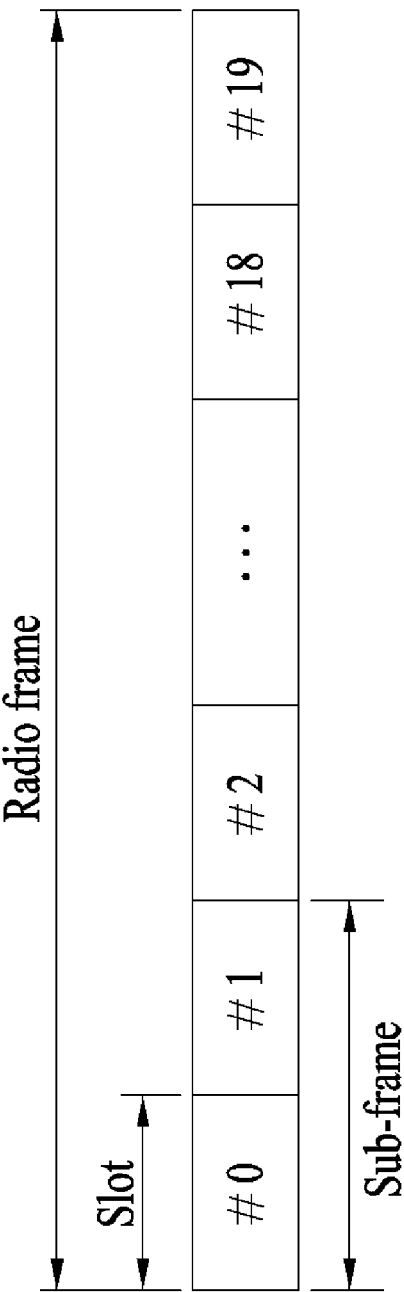
FIG. 2 is a diagram illustrating a structure of a radio frame of 3GPP LTE/LTE-A system.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

FIG. 2 is a diagram illustrating a structure of a radio frame of 3GPP LTE/LTE-A system.

A radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first three OFDM symbols of each subframe may be allocated to a Physical Downlink Control CHannel (PDCCH) and the other OFDM symbols may be allocated to a Physical Downlink Shared Channel (PDSCH).

Figure 3:
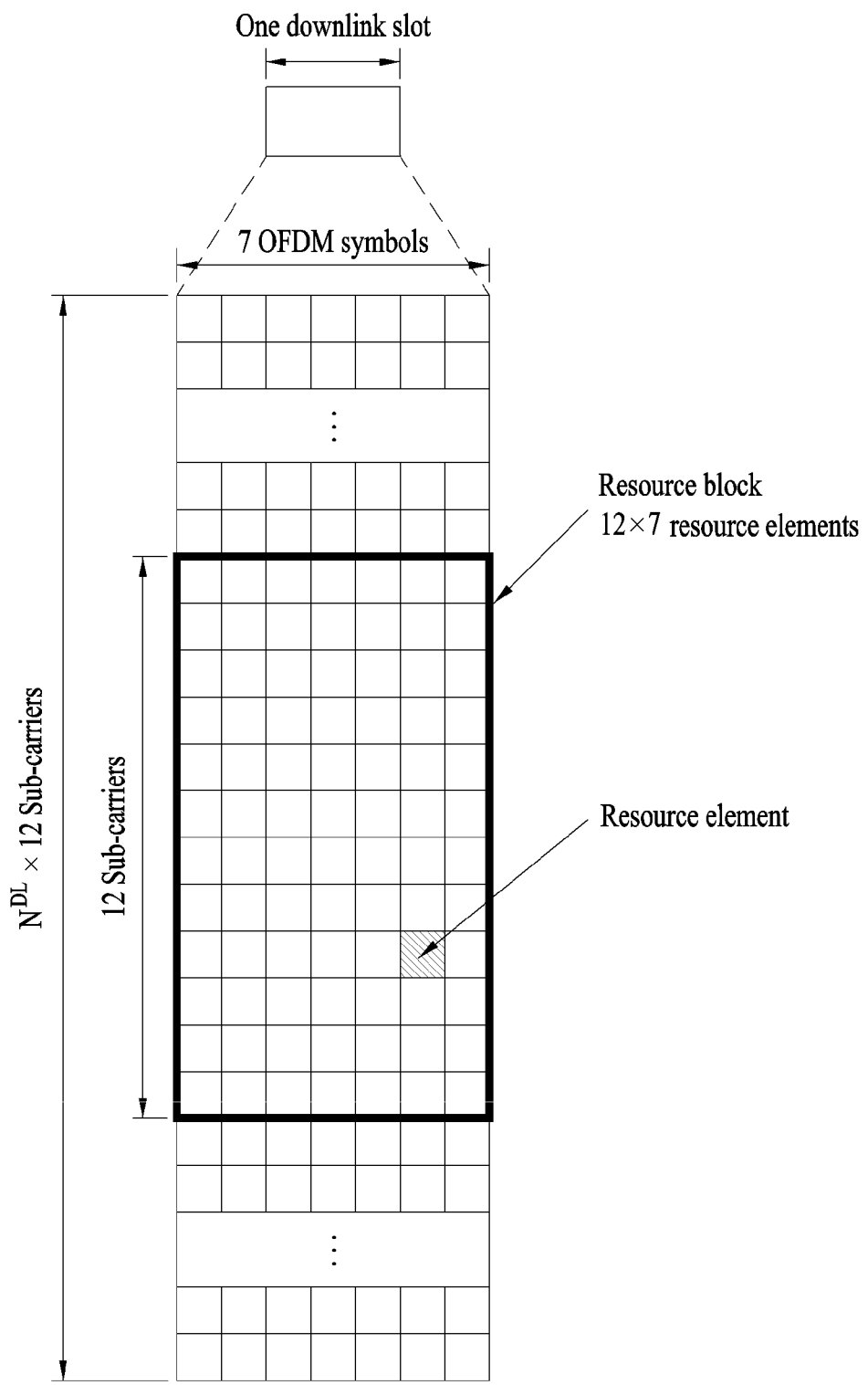
FIG. 3 is a diagram illustrating a resource grid of a downlink slot of 3GPP LTE/LTE-A system corresponding to one example of a wireless communication system.

FIG. 3 is a diagram illustrating a resource grid of a downlink slot of 3GPP LTE/LTE-A system corresponding to one example of a wireless communication system.

Referring to FIG. 3, a downlink slot includes a plurality of OFDM symbols in time domain. A downlink slot includes 7 (or 6) OFDM symbols and an RB includes 12 subcarriers in frequency domain. Each element of a resource grid is referred to as a Resource Element (RE). An RB includes 12×7(6) REs. The number ($N_{RB}$) of RBs included in a downlink slot depends on a downlink transmission bandwidth. An uplink slot may have the same structure as a downlink slot. In this case, an OFDM symbol is replaced with an SC-FDMA symbol.

Figure 4:
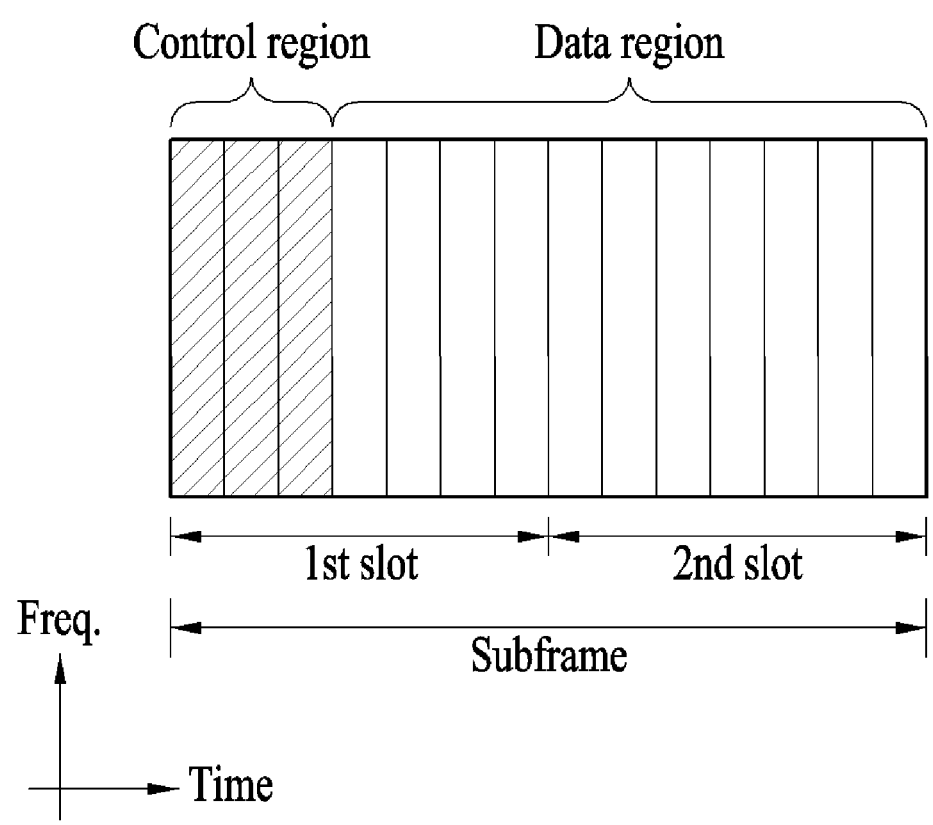
FIG. 4 is a diagram illustrating a structure of a downlink subframe of 3GPP LTE system corresponding to one example of a wireless communication system.

FIG. 4 is a diagram illustrating a structure of a downlink subframe of 3GPP LTE system corresponding to one example of a wireless communication system.

Referring to FIG. 4, a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

Control information transmitted on PDCCH is referred to as DCI (Downlink Control Information). A DCI format includes a format 0 defined for uplink and formats 1, 1A, 1B, 1C, 1D, 2, 2A, 3, 3A, and the like defined foe downlink. The DCI format selectively includes such information as a hopping flag, RB allocation. MCS (modulation coding scheme). RV (redundancy version), NDI (new data indicator), TPC (transmit power control), cyclic shift DM RS (demodulation reference signal), CQI (channel quality information) request, HARQ process number. TPMI (transmitted precoding matrix indicator), PMI (precoding matrix indicator) confirmation, and the like.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
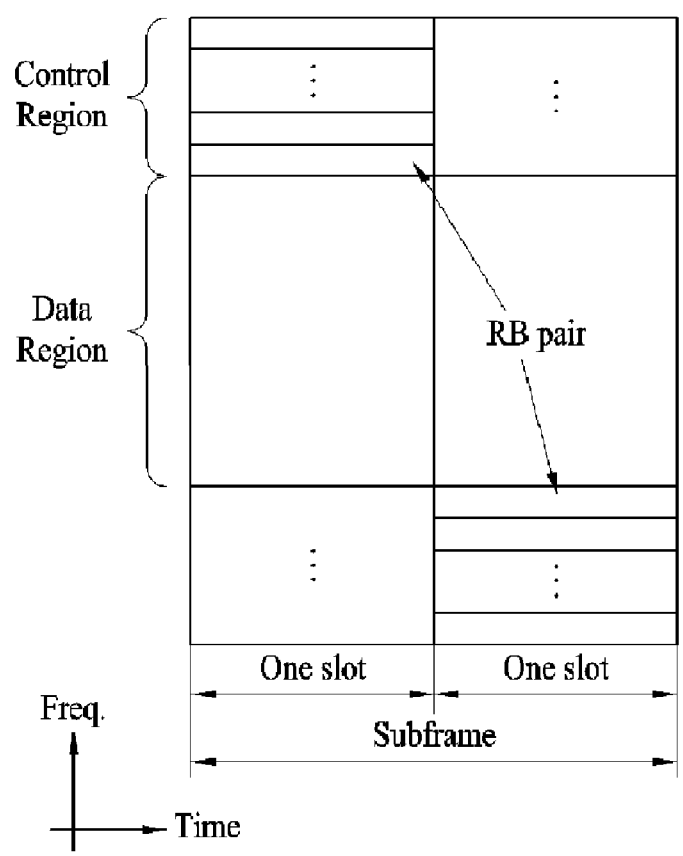
FIG. 5 is a diagram illustrating a structure of an uplink subframe of 3GPP LTE system corresponding to one example of a wireless communication system.

FIG. 5 is a diagram illustrating a structure of an uplink subframe of 3GPP LTE system corresponding to one example of a wireless communication system.

Referring to FIG. 5, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (Scheduling Request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CQI (Channel Quality Indicator): Feedback information on a DL channel. MIMO (multiple input multiple output)-related feedback information includes an RI (Rank Indicator), a PMI (Precoding Matrix Indicator), a PTI (Precoding Type Indicator) and the like. 20 bits per subframe are used.

An amount of control information (UCI) capable of being transmitted by a user equipment in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (Sounding Reference Signal) is set, the last SC-FDMA symbol of the subframe is also excluded. A reference signal is used for coherent detection of PUCCH. The PUCCH supports 7 formats depending on information transmitted on the PUCCH.

Figure 6:
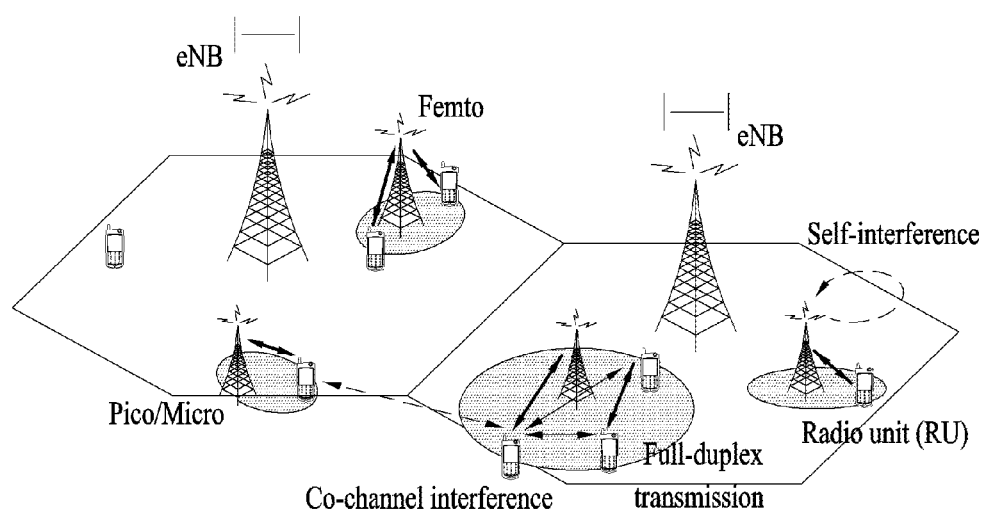
FIG. 6 is a conceptual diagram for a user equipment and a base station supporting FDR.

FIG. 6 is a conceptual diagram for a user equipment and a base station supporting FDR.

In the aspect of a random wireless device, FDR (Frequency Duplex Radio) using a single frequency transmission band can be defined by a transmission resource configuration scheme that performs transmission and reception at the same time via the single frequency transmission band. As a specific example, when wireless communication is performed between a general base station (or a relay, a relay node, a remote radio head (RRH), etc.) and a wireless UE, the transmission resource configuration scheme can be comprehended as a transmission resource configuration scheme that simultaneously performs DL transmission and UL reception of the base station and DL reception and UL transmission of the wireless UE via a single frequency transmission band. As a different example, when device-to-device direct communication (D2D communication) is performed between wireless UEs, the transmission resource configuration scheme can be comprehended as a transmission resource configuration scheme that simultaneously performs transmission and reception on the same frequency transmission band between the wireless UEs.

In the following, the present invention illustrates a case of performing wireless transmission and reception between a general base station and a wireless UE and describes FDR-related technologies. However, it is apparent that the present invention also includes a case of performing wireless transmission and reception between a UE and a network rather than the general base station. Moreover, it is apparent that the present invention includes a case of performing direct communication between UEs as well.

In the FDR situation illustrated in FIG. 6, three types of interference described in the following may exist.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

Figure 7:
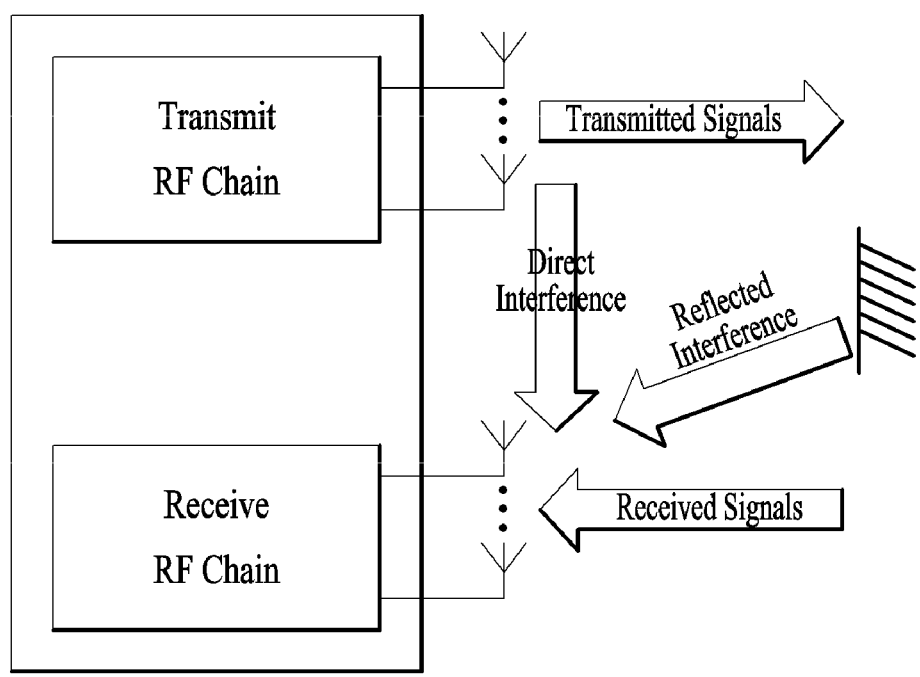
FIG. 7 is a conceptual diagram illustrating a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise (BW = 20 MHz) | Receiver NF | Receiver Thermal Noise Level | Self-IC Target ($P_A$-TN-NF) |
| --- | --- | --- | --- | --- | --- |
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0,BW}$=−174 dBm+10×$\log_{10}$ (BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
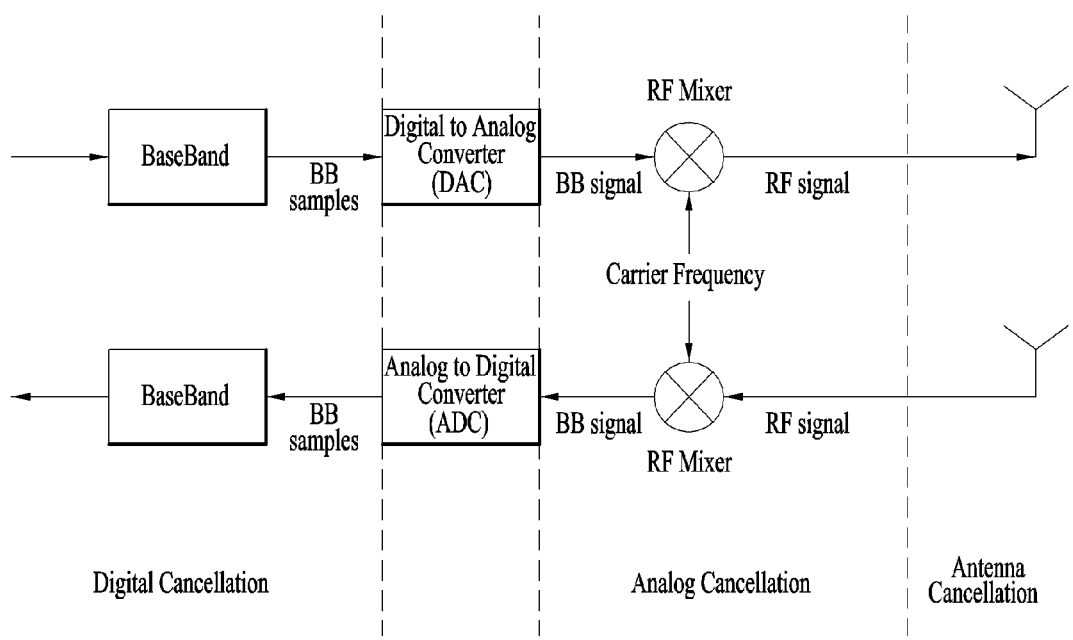
FIG. 8 is a diagram illustrating positions to which three interference schemes are applied at an RF transmission/reception end (or RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
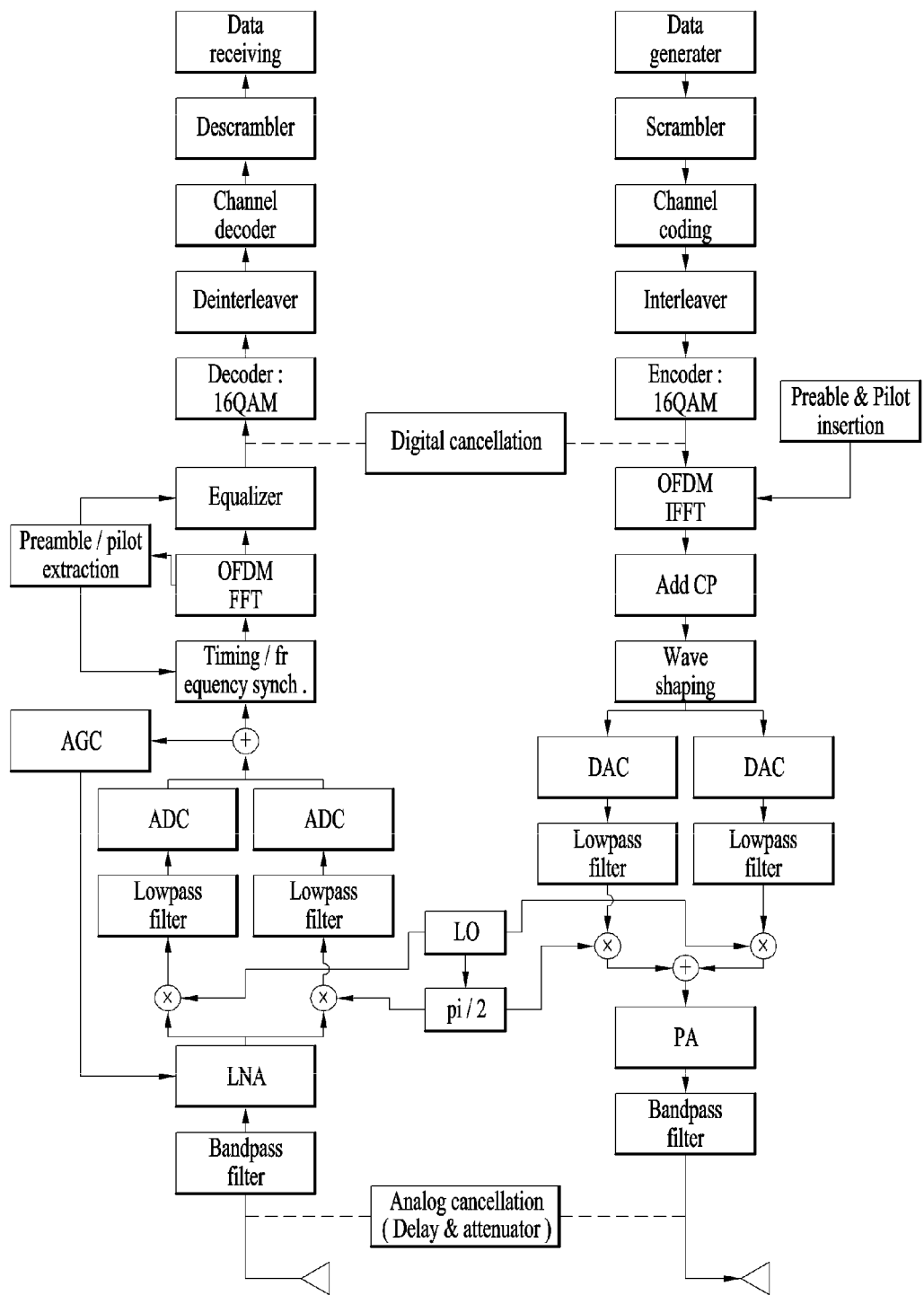
FIG. 9 is a block diagram illustrating a device for canceling self-interference in a communication device proposed in communication system environment using OFDM based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9. A functional block may be added to or removed from an RF Tx end and an RF Rx end shown in FIG. 9 according to a purpose.

Signal Modeling of FDR System

Since the FDR system uses the same frequency for the Tx signal and the Rx signal, non-linear components of the RF are greatly affected. In particular, Tx signals are distorted due to nonlinear characteristics of active apparatuses such as the power amplifier (PA) and the low noise amplifier (LNA). Due to such distortions, modeling of the Tx signal may include high-order components. Thereamong, even-order components, which affect DC periphery, can be effectively removed using the conventional AC coupling or filtering technique. However, the odd-order components, which appear in the vicinity of an existing frequency, are not easily removed compared to the even-order components, and have a great influence upon reception. Considering these nonlinear characteristics of the odd-order components, the Rx signal after the ADC in the FDR system may be represented by Equation 1 below, using the parallel Hammerstein (PH) model.

$$y(n) = \quad \text{[Equation 1]}$$
$$h_D(n) * x_D(n) + \sum_{\substack{k=1,\ldots,K \\ k=odd}} h_{SI,k}(n) * |x_{SI}(n)|^{k-1} x_{SI}(n) + z(n)$$

In Equation 1, k has an odd number value, xSI[n] indicates data transmitted at an RF transmitting end of the apparatus, hSI[n] indicates a gain of a self-interference channel (self-channel) through which the data transmitted at the RF transmitting end passes, xD[n] indicates data which an RF end of the apparatus desires to receive, hD[n] indicates a gain of a desired channel through which the data that the RE end desires to receive passes, and z[n] indicates Additive White Gaussian Noise (AWGN). In this case, if k is equal to 1, it corresponds to a linear component. If k is an odd number equal to or greater than 3, it corresponds to a nonlinear component.

In order to cancel the analog self-interference or the digital self-interference, it is necessary to estimate a self-interference channel. In this case, when a signal is received after self-interference cancellation is performed using a gain of an estimated analog self-interference channel or a digital self-interference channel, it is able to express the signal using an equation 2 described in the following.

$$y_{Self-IC}(n) = h_D(n) * x_D(n) + \quad \text{[Equation 2]}$$
$$\underbrace{\sum_{\substack{k=1,\ldots,K \\ k=odd}} \left( h_{SI,k}(n) - \hat{h}_{SI,k}(n) \right) * |x_{SI}(n)|^{k-1} x_{SI}(n) + z(n)}_{Residual\ SI}$$

When the received signal is decoded using $\hat{h}_D(n)$ corresponding to a gain of an estimated desired channel, it can be represented as an equation 3 described in the following.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2} \quad \text{[Equation 3]}$$
$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

In this case, $$z'(n) = \sum_{\substack{k=1,\ldots,K \\ k=odd}} \left( h_{SI,k}(n) - \hat{h}_{SI,k}(n) \right) * |x_{SI}(n)|^{k-1} x_{SI}(n) + z(n)$$

and $$e(n) = h_D(n) - \hat{h}_D(n).$$

In the following, when a retransmission is requested in a Full Duplex Radio (FDR) system, a method of increasing a success rate of the retransmission by transmitting information on whether or not a UE supporting FDR has successfully performed self-interference cancellation (SIC) to a base station is proposed.

Basic Procedure of IR-HARQ for DL Based on NACK Signaling from UE

When a UE receives a downlink signal, a decoding procedure is performed on the signal. In this case, if the UE fails to decode data, a retransmission is requested to a base station based on a HARQ (Hybrid automatic repeat request) procedure that the UE transmits NACK (signal) to the base station via PUCCH or PUSCH. The basic procedure is described in the following.

Figure 10:
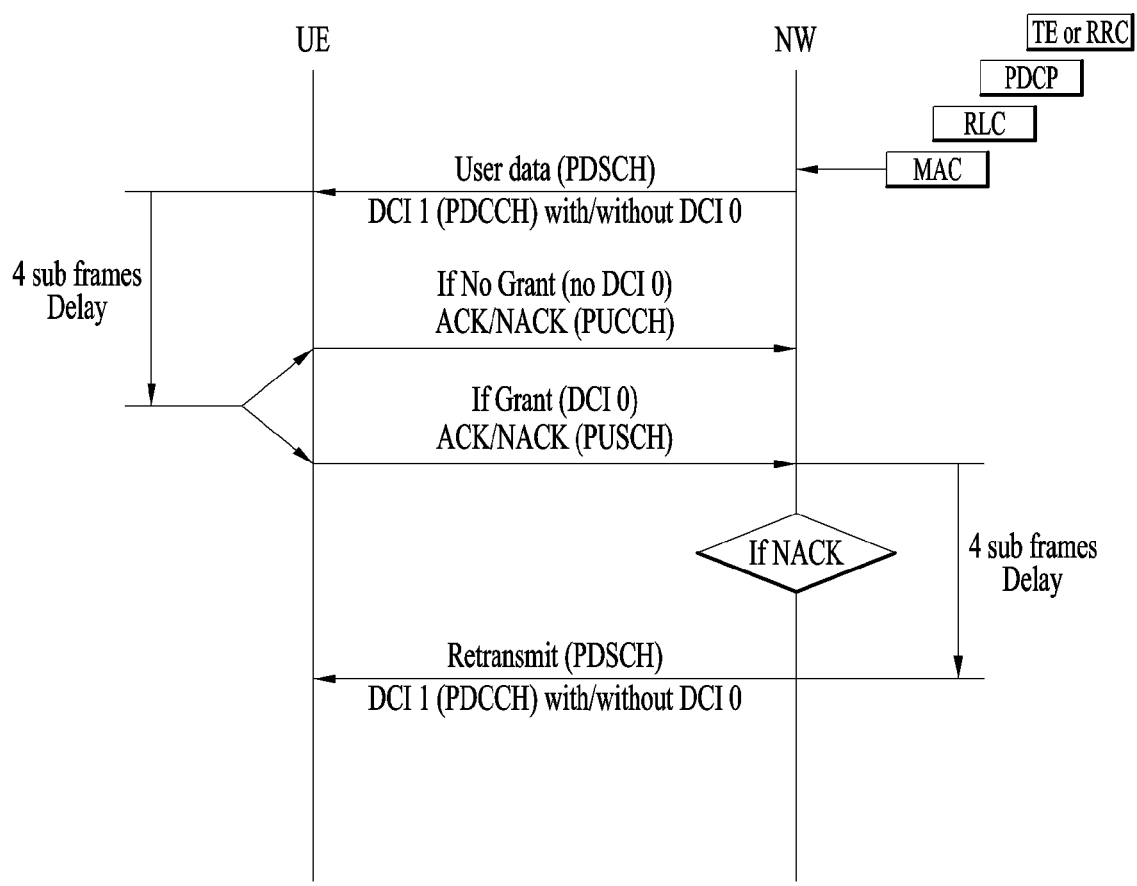
FIG. 10 is a diagram illustrating a basic procedure of downlink HARQ.

FIG. 10 is a diagram illustrating a basic procedure of downlink HARQ.

Referring to FIG. 10, a user equipment (UE) receives PDSCH including user data from a network (NW) (e.g., base station). In this case, the PDSCH can be scheduled by a DCI (format) 1 of PDCCH. In this case, a subframe in which ACK/NACK is transmitted may vary depending on whether or not the PDCCH includes a DCI (format) 0. For example, if the PDCCH does not include the DCI (format) 0, the UE transmits ACK/NACK via PUCCH in a $4^{th}$ subframe (subframe n+4) appearing after a subframe (subframe n) in which the PDSCH is received). Otherwise, the UE can transmit ACK/NACK via PUSCH. When the base station receives a signal from the UE, the base station determines whether the signal corresponds to ACK or NACK. If the signal corresponds to NACK, the base station can retransmit the PDSCH in a $4^{th}$ subframe appearing after a subframe in which the NACK is received.

Unlike HARQ of UL, the UE has no information on a DL HARQ procedure. However, the UE obtains information on the DL HARQ procedure via information (Process ID, RV (Redundancy Version) value) included in DCI (format) of PDCCH transmitted by the base station. The UE performs decoding based on data of the retransmitted PDSCH.

Figure 11:
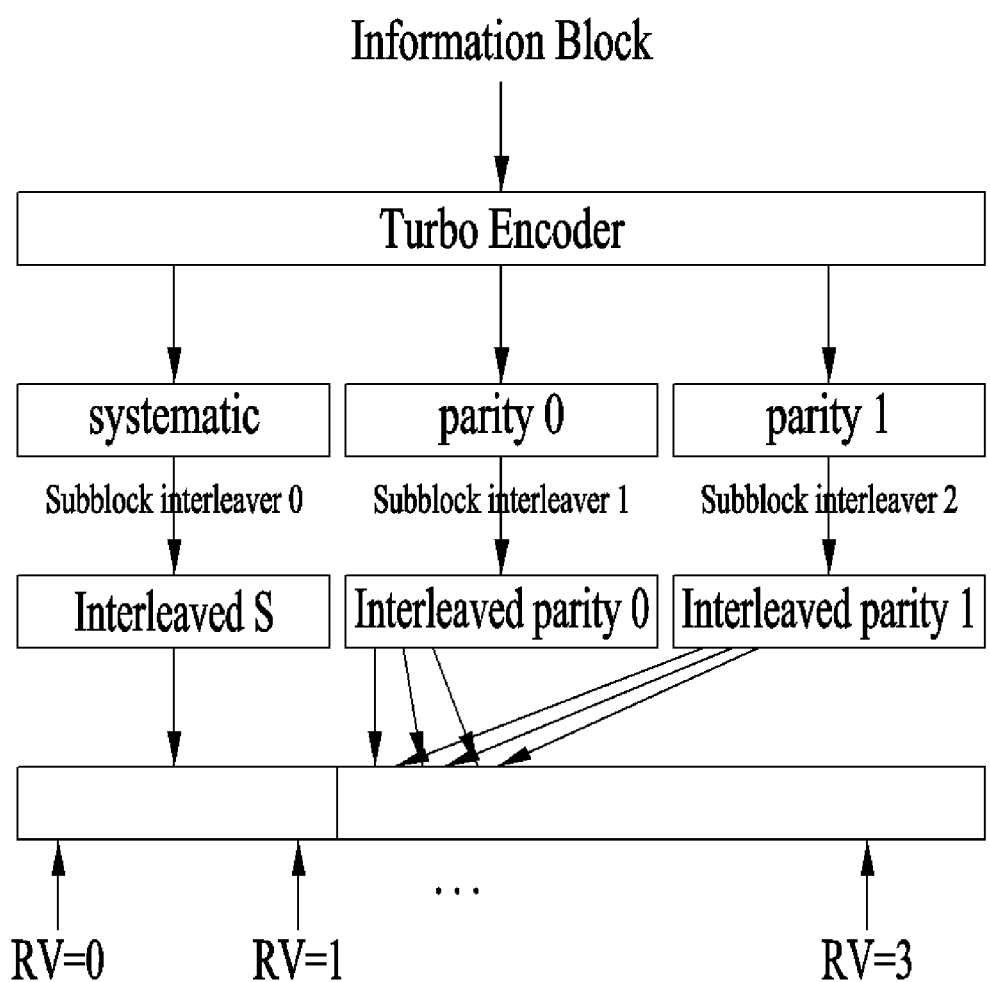
FIG. 11 is a diagram illustrating a turbo encoder equipped with a rate matching module in LTE/LTE-A system and FIG. 12 is a diagram illustrating a circular buffer structure for a rate matching module in LTE/LTE-A system.
Figure 12:
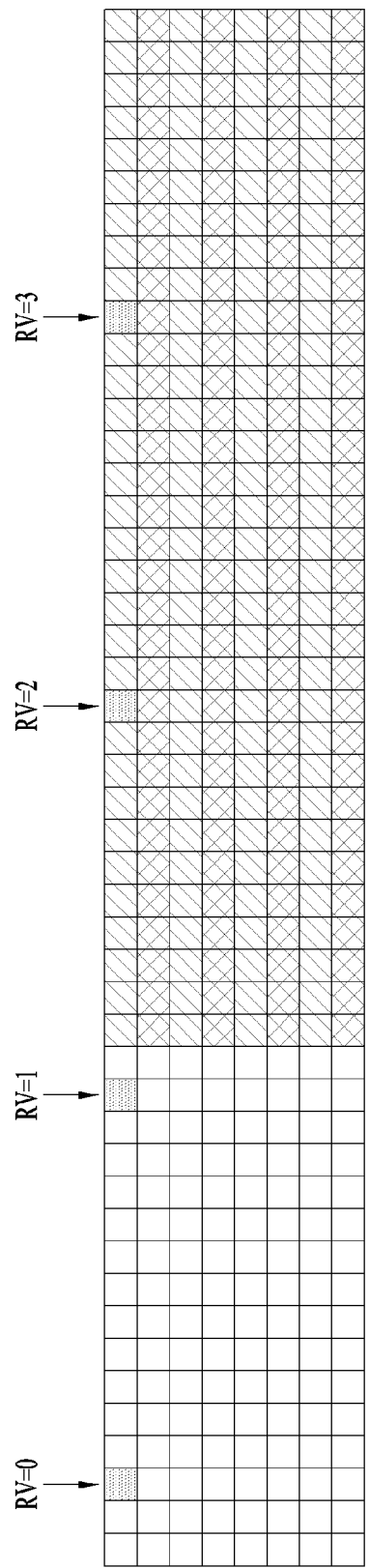

FIG. 11 is a diagram illustrating a turbo encoder equipped with a rate matching module in LTE/LTE-A system and FIG. 12 is a diagram illustrating a circular buffer structure for a rate matching module in LTE/LTE-A system.

When retransmission is performed in a current LTE-based system, RV values of a signal encoded by a turbo encoder shown in FIG. 11 via rate matching are transmitted by changing the RV values in an order of 0, 2, 1, 3 (refer to TS36.321 "5.4.2.2 HARQ process"). As shown in FIG. 12, when retransmission is performed using a circular buffer, the retransmission can be performed by reusing a part of previously encoded signals without making an additional encoded signal.

Reason why FDR UE Fails to Perform Decoding

A legacy UE may fail to decode a DL signal due to channel quality of a DL channel or interference from other cell/UE. On the other hand, a FDR UE may fail to decode received data when the FDR UE is unable to properly perform self-interference cancellation. A procedure for managing legacy self-interference cancellation in FDR system is illustrated in FIG. 13.

Figure 13:
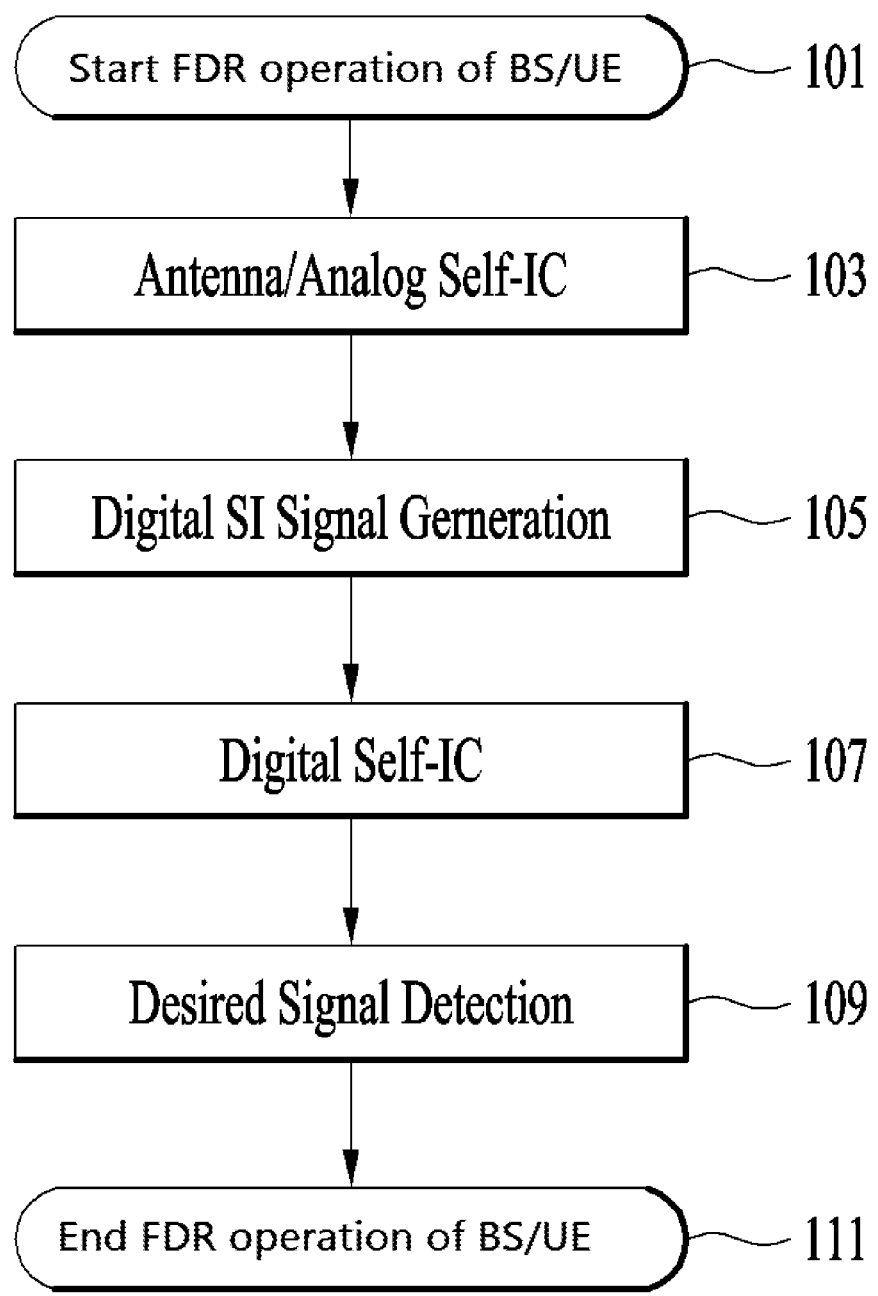
FIG. 13 is a flowchart illustrating a procedure of a self-interference cancellation management scheme in an operation of a FDR mode.

FIG. 13 is a flowchart illustrating a procedure of a self-interference cancellation management scheme in an operation of a FDR mode.

First of all, when a communication device (base station/UE) operates in a FDR mode, if the communication device performs antenna self-interference cancellation and analog self-interference cancellation on a received signal, such a signal as the equation 1 is generated. Subsequently, a self-interference signal is generated from the equation 1 signal via digital self-interference signal generation and digital self-interference cancellation is performed based on the generated signal to obtain such a signal as the equation 2. Subsequently, as shown in the equation 3, the signal is decoded in a desired signal detection block and all procedures end.

Meanwhile, as mentioned in the foregoing description, detection performance of a received signal is considerably influenced by an estimated self-interference channel ($\hat{h}_{SI,k}(n)$) and accuracy of a desired channel ($\hat{h}_D(n)$). In particular, whether or not self-interference is successfully cancelled can be determined based on a result on whether a final reception signal is successfully detected or not. Table 2 in the following indicates a correlation between a detection success/failure of a reception signal and a success/failure of self-interference cancellation.

TABLE 2

|  | Self-interference cancellation success | Self-interference cancellation failure |
|---|---|---|
| Reception signal detection success | Case 1 | None |
| Reception signal detection failure | Case 2 | Case 3 |

According to Case 1, a desired signal is successfully received after digital self-interference cancellation is performed. According to Case 2, although digital self-interference cancellation is successfully performed, a desired channel is wrongly estimated, link quality is poor, or a reception signal is not estimated due to interference from other cell/UE. According to Case 3, a reception signal is not detected due to the failure of self-interference cancellation. If the self-interference cancellation fails, since strength of a self-interference signal is much stronger than strength of a reception signal, it is determined that a case of successfully detecting a reception signal does not occur.

The failure of the self-interference cancellation can be determined based on the following.

1. After passing through an analog-digital converter (ADC), when a difference between several consecutive samples is equal to or less than '0'

2. When a deviation level of EVM deviated from a constellation point is high in a decoding stage 3. After error correction code decoding is performed, when similarity with a self-interference signal corresponding to a known signal is high Besides the criteria (1 to 3), if a criterion is able to properly determine whether or not self-interference cancellation is successfully performed, it is able to use the criterion.

When FDR UE Fails to Perform Decoding Due to the Failure of Self-Interference Cancellation, Problem of Legacy IR-HARQ Procedure As mentioned in the foregoing description, according to IR-HARQ procedure for DL, a base station determines whether to perform retransmission based on NACK information of a UE only. However, the base station is unable to know a reason for the occurrence of the NACK. In particular, when a UE supportive of FDR mode operates in the FDR mode, if NACK occurs, as mentioned in the foregoing description, recoverability varies at the time of receiving a retransmission signal based on whether self-interference cancellation is succeeded or failed.

Figure 14:
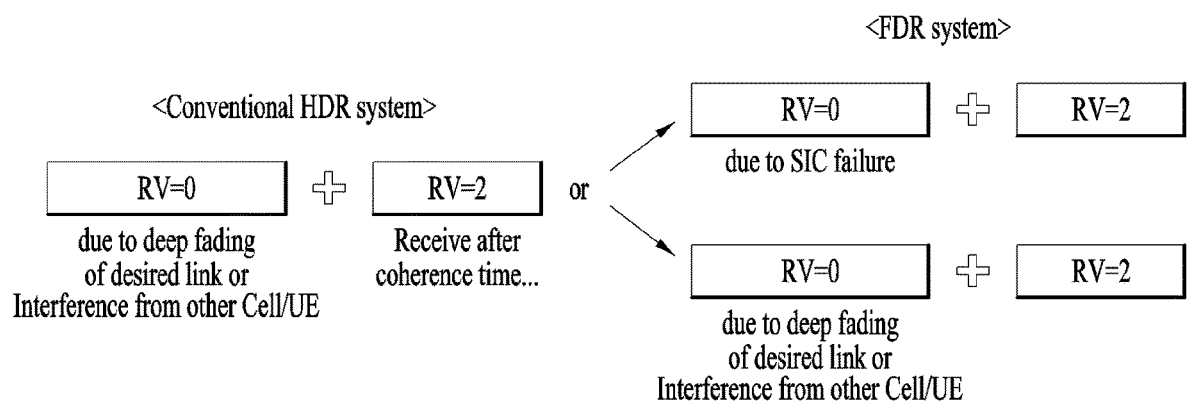
FIG. 14 is a diagram for explaining a part differentiated due to HARQ retransmission between a conventional system and a FDR system.

FIG. 14 is a diagram for explaining a part differentiated due to HARQ retransmission between a conventional system and a FDR system.

Referring to FIG. 14, when a conventional system (i.e., a system operating in HDR mode) fails to transmit an initial packet (RV=0), the convention system performs retransmission by changing an RV value (RV=0→RV=2) due to IR-HARQ procedure for a conventional downlink. The convention system performs joint decoding with the initial packet (a packet having RV=0) and a retransmitted packet (a retransmitted packet having RV=2). On the contrary, as mentioned in the foregoing description, when a FDR system fails to perform self-interference cancellation due to one of the reasons of NACK, it is highly probable that a packet received by retransmission also fails to perform self-interference cancellation. In this case, when retransmission is performed according to the IR-HARQ procedure for a legacy downlink, it is unable to guarantee high reliability. In particular, when a reason of NACK corresponds to the failure of the self-interference cancellation in the FDR system, it is necessary to have a procedure different from the IR-HARQ procedure for the legacy downlink.

Embodiment 1

When NACK is transmitted in response to a DL signal due to the failure of self-interference cancellation of a UE, it is necessary to make a base station know whether or not the self-interference cancellation fails. To this end, the UE can transmit an indicator (e.g., self-interference cancellation (SIC) success flag) indicating whether or not the self-interference cancellation succeeds to the base station via PUCCH or PUSCH. As mentioned in the foregoing description, when the UE transmits NACK to the base station due to the failure of the self-interference cancellation in the FDR system, it is necessary to have a procedure different from an IR-HARQ procedure for a legacy downlink.

Figure 15:
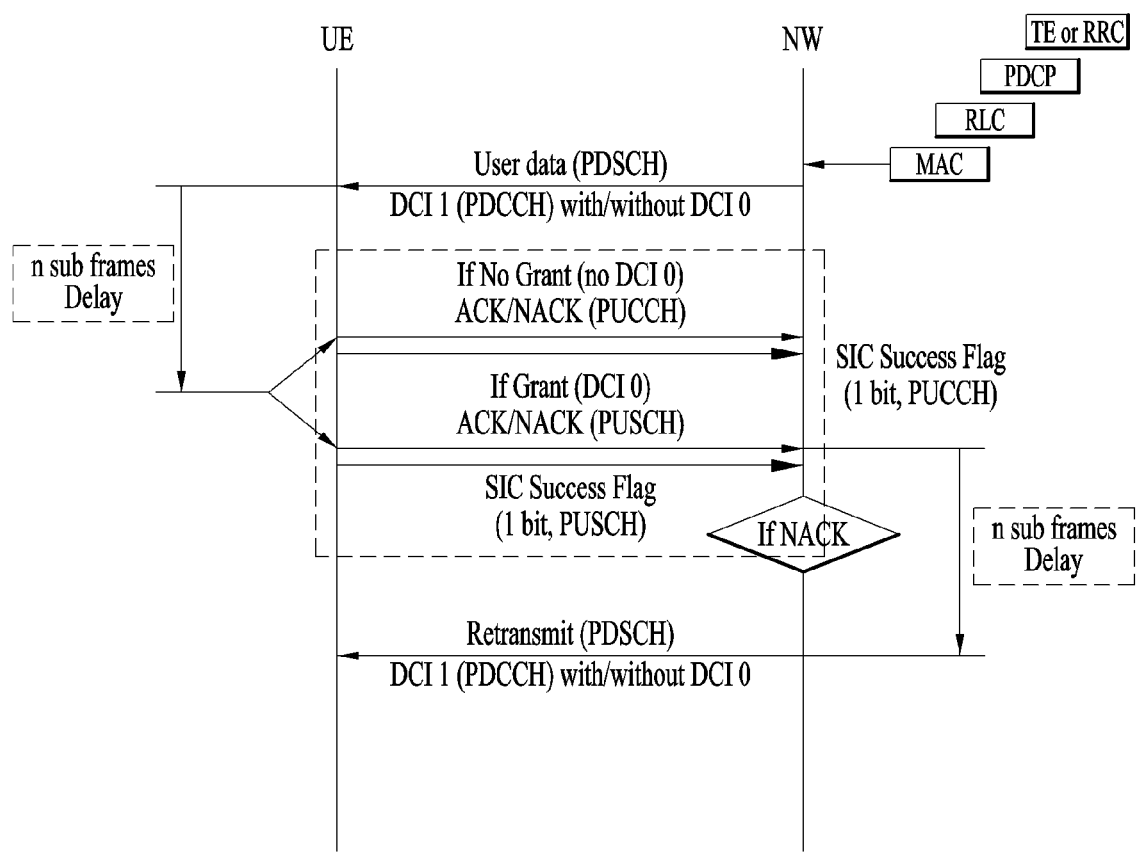
FIG. 15 is a flowchart illustrating HARQ procedures for performing retransmission in a FDR system according to an embodiment 1 of the present invention.

FIG. 15 is a flowchart illustrating HARQ procedures for performing retransmission in a FDR system according to an embodiment 1 of the present invention.

Since HARQ procedures illustrated in FIG. 15 for performing, retransmission in a FDR system are very similar to HARQ procedures illustrated in FIG. 10 for performing retransmission in a HDR system, explanation on a similar part is omitted and a different point is mainly explained.

Referring to FIG. 15, according to the HARQ procedure for performing retransmission in the FDR system, when a UE in FDR mode transmits a NACK signal in response to the reception of PDSCH, the UE can transmit PUCCH or PUSCH by further including an indicator (e.g., self-interference cancellation (SIC) success flag) indicating whether or not self-interference cancellation succeeds in the PUCCH or the PUSCH. Referring to FIG. 10, according to the HARQ procedure for performing retransmission in the HDR system, a UE transmits ACK/NACK in a $4^{th}$ subframe appearing after a subframe in which PDSCH is received and a base station performs retransmission in a $4^{th}$ subframe appearing after a subframe in which ACK/NACK is received. On the other hand, according to the HARQ procedure for performing retransmission in the FDR system, a UE transmits ACK/NACK in an $n^{th}$ subframe appearing after a subframe in which PDSCH is received and a base station performs retransmission in an $n^{th}$ subframe appearing after a subframe in which ACK/NACK is received. In this case, the n is not restricted to 4.

When the SIC success flag is allocated by 1 bit, the SIC success flag can indicate information described in the following.

SIC success flag=1 (true): when a UE succeeds in cancelling self-interference at the time of decoding a corresponding packet.

SIC success flag=0 (false): when a UE fails in cancelling self-interference at the time of decoding a corresponding packet.

When the SIC success flag is allocated by n bit, the SIC success flag can indicate information described in the following.

SIC success flag=0~2n−1 (true): information indicating whether or not a UE succeeds in cancelling self-interference at the time of decoding a corresponding packet according to a sub-band, information indicating whether or not a UE succeeds in cancelling self-interference at the time of decoding a corresponding packet according to a PRB, or information indicating whether or not a UE succeeds in cancelling self-interference at the time of decoding a corresponding packet according to an RBG (Resource Block Group).

Embodiment 2

When a UE in FDR mode performs retransmission using the SIC success flag, in order to make a packet, which is retransmitted due to the failure of self-interference cancellation of the UE, to be robust, a base station can perform an appropriate procedure for the UE.

When the UE transmits NACK in response to a DL signal due to the failure of self-interference cancellation, in order to succeed in cancelling self-interference at the time of retransmission, the UE can transmit information on a resource index (e.g., RBG index, PRB index, sub-band index) at which the self-interference cancellation has been recently succeeded to the base station.

As mentioned in the foregoing description, when the UE transmits NACK to the base station due to the failure of the self-interference cancellation in the FDR system, it is necessary to have procedures different from IR-HARQ procedures for a legacy downlink. The procedures are explained with reference to FIG. 16 in the following.

Figure 16:
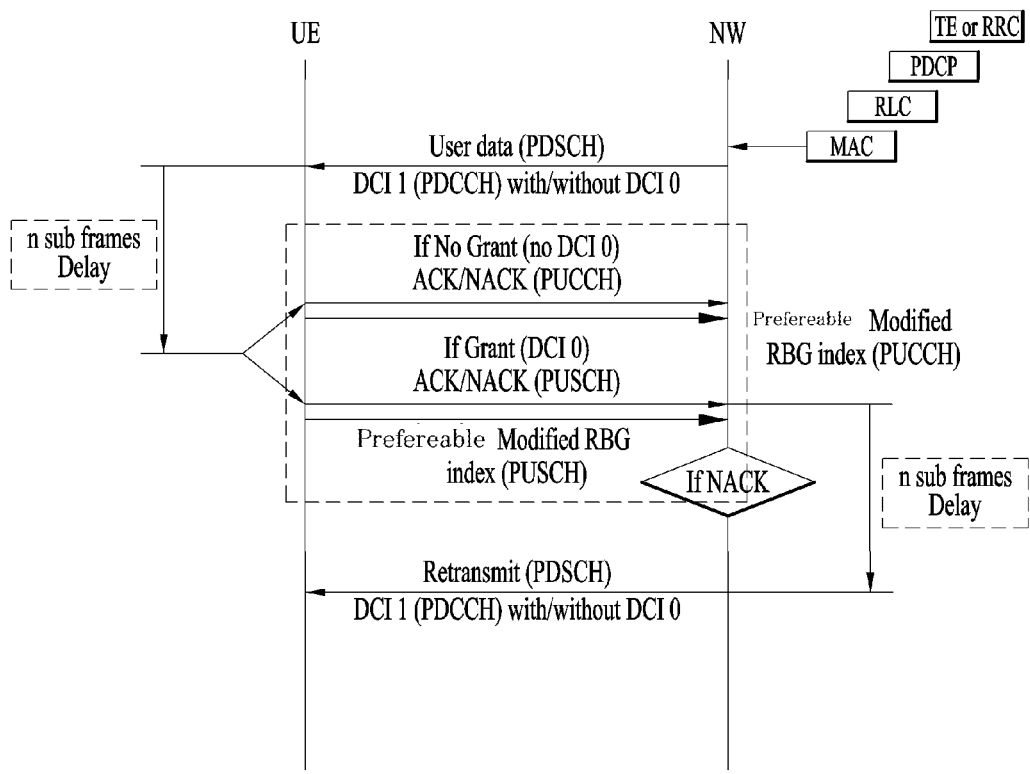
FIG. 16 is a flowchart illustrating HARQ procedures for performing retransmission in a FDR system according to an embodiment 2 of the present invention.

FIG. 16 is a flowchart illustrating HARQ procedures for performing retransmission in a FDR system according to an embodiment 2 of the present invention.

When a UE operating in FDR mode transmits ACK/NACK to a base station, the UE can also transmit information on a resource preferred by the UE (e.g., RBG index, PRB index, sub-band index) to the base station via PUCCH or PUSCH in consideration of self-interference cancellation. In the embodiment 2, the information on the resource can be included in PUCCH or PUSCH together with the SIC success flag bit mentioned earlier in the embodiment 1. Or, the information can be solely included in PUCCH or PUSCH.

When a UE performs retransmission using the information on the resource (e.g., RBG index, PRB index, sub-band index) in the FDR mode, in order to make a packet, which is retransmitted due to the failure of self-interference cancellation of the UE, to be robust, a base station can allocate an appropriate resource to the UE. In this case, the information on the resource (e.g., RBG index, PRB index, sub-band index) may correspond to an RBG index, a PRB index or a sub-band index of a conventional HDR system. Or, the information on the resource may correspond to an RBG index, a PRB index or a sub-band index modified for a FDR system.

Embodiment 3

When a UE transmits NACK to a base station in response to a DL signal due to the failure of self-interference cancellation, in order to succeed in cancelling self-interference at the time of retransmission, the UE can transmit a preferred MCS (Modulation and Coding Scheme) index to the base station in consideration of a residual self-interference signal. As mentioned in the foregoing description, when the UE transmits NACK to the base station due to the failure of the self-interference cancellation in the FDR system, it is necessary to have procedures different from IR-HARQ procedures for a legacy downlink. The procedures are explained with reference to FIG. 17 in the following.

Figure 17:
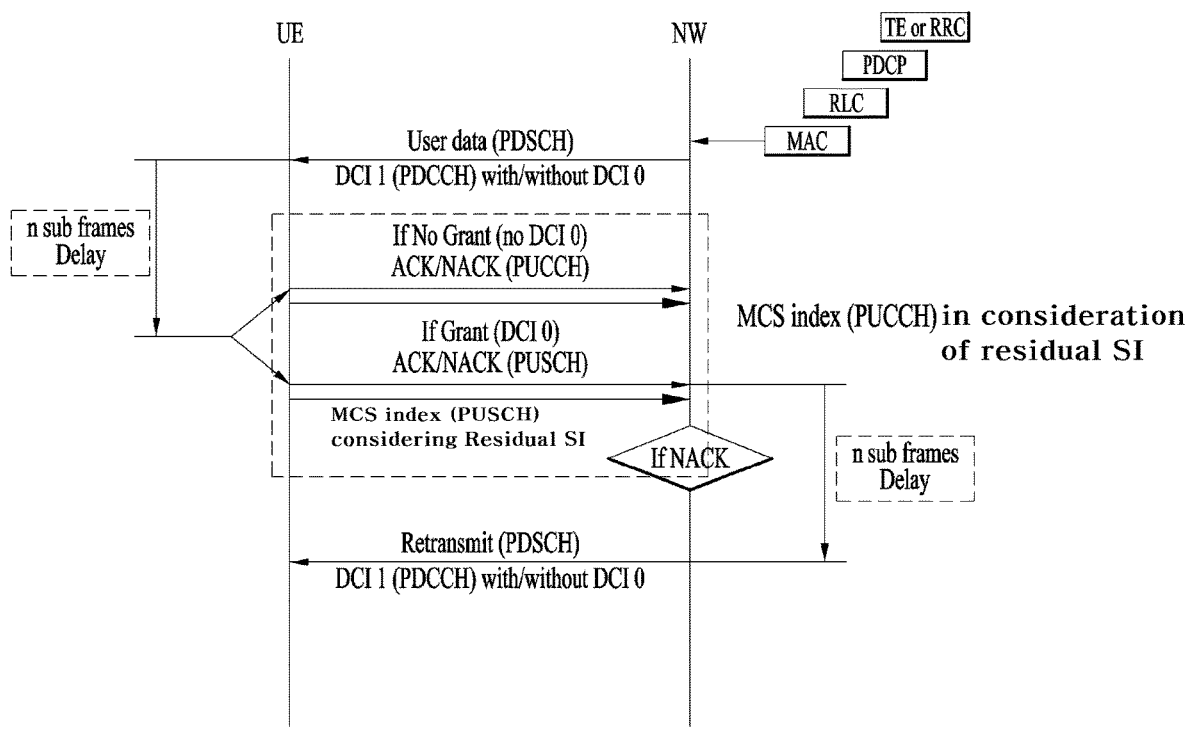
FIG. 17 is a flowchart illustrating HARQ procedures for performing retransmission in a FDR system according to an embodiment 3 of the present invention.

FIG. 17 is a flowchart illustrating HARQ procedures for performing retransmission in a FDR system according to an embodiment 3 of the present invention.

Referring to FIG. 17, when a UE transmits ACK/NACK to a base station, the UE can also transmit a modified MCS level preferred by the UE to the base station via PUCCH or PUSCH in consideration of a residual self-interference signal (or strength of a residual self-interference signal) of the UE. When the UE performs retransmission in the FDR mode, in order to make a packet, which is retransmitted due to the failure of self-interference cancellation of the UE, to be robust, the base station can perform resource allocation or scheduling based on an MCS level which is selected in consideration of the residual self-interference signal received from the UE.

In addition to ACK/NACK signal, the UE can transmit additional information to the base station via PUCCH or PUSCH using a combination of the embodiments 1, 2 and 3.

Embodiment 4

When the SIC success flag corresponds to 0, in order to make a packet, which is retransmitted due to the failure of self-interference cancellation of a UE, to be robust, a base station can perform an operation different from a legacy HARQ procedure. As mentioned in the foregoing description, in order to make a packet, which is retransmitted due to the failure of self-interference cancellation of the UE, to be robust, similar to the embodiment 1, the base station may change the HARQ procedure using embodiments 4-1 to 4-6 described in the following to make a packet transmitted to the UE cancel self-interference well by utilizing the SIC success flag information received from the UE.

Embodiment 4-1

When the SIC success flag corresponds to 0, it is able to perform transmission using chase combining.

In order to make a packet, which is retransmitted due to the failure of self-interference cancellation of the UE, to be robust, a base station can transmit the packet using a chase combining (CC) scheme rather than an IR scheme that changes an RV value at the time of retransmission.

Embodiment 4-2

When the SIC success flag corresponds to 0, an RV value is forcibly configured by a previously transmitted value (RV=0) and can be transmitted via DCI.

In order to make a packet, which is retransmitted due to the failure of self-interference cancellation of the UE, to be robust, a base station may forcibly covert an RV value into 0 from 2 via DCI at the time of retransmission and can retransmit the converted RV value to the UE. The UE combines an initially received packet (RV=0) with a retransmitted packet (RV=0) and then performs decoding. If the UE fails to perform decoding, the UE discards the previously failed packet and may be able to perform decoding using the retransmitted packet (RV=0) only.

Embodiment 4-3

When the SIC success flag corresponds to 0, an MCS level is adjusted, an RV value is forcibly configured by a previously transmitted value (RV=0), and the RV value can be transmitted via DCI. In order to make a UE easily perform decoding using a retransmitted packet (RV=0) mentioned earlier in the embodiment 2 only, a base station can perform retransmission by adjusting an MCS level.

Embodiment 4-4

When the SIC success flag corresponds to 0, a base station allocates an RV value, which is changed by a packet size capable of performing decoding using a retransmission packet only, and a PRB for performing retransmission and can transmit the RV value and the PRB to a UE via DCI. The UE can receive retransmission data based on the RV value according to the DCI and PRB information.

Figure 18:
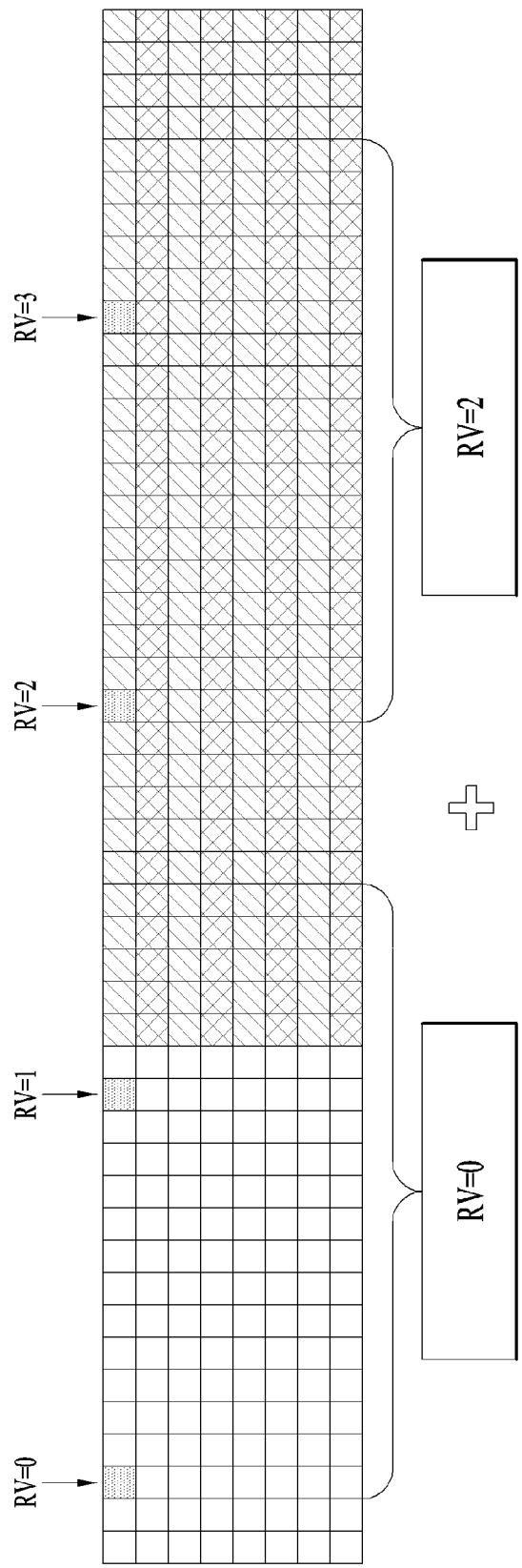
FIG. 18 is a diagram illustrating a PRB size capable of decoding a retransmission packet.

FIG. 18 is a diagram illustrating a PRB size capable of decoding a retransmission packet.

In order to make a packet, which is retransmitted due to the failure of self-interference cancellation of a UE, to be robust, a base station can perform retransmission by allocating a PRB capable of performing decoding using a retransmission packet only. In this case, the UE performs joint decoding on an initially received packet (RV=0) and a retransmitted packet (RV=2). If the UE fails to perform decoding, the UE discards the previously failed packet and can perform decoding using the retransmitted packet (RV=2) only.

Embodiment 4-5

When the SIC success flag corresponds to 0, it may be able to configure a UE to operate in HDR (Half Duplex Radio) mode. In order to make a packet, which is retransmitted due to the failure of self-interference cancellation of the UE, to be robust, it is able to configure the UE to operate in the HDR mode to prevent self-interference when the UE receives retransmission. To this end, the base station can inform the UE of a duplex mode (e.g., half duplex) in which the UE operates via PDCCH. Or, the base station may allocate a DL grant only to PDCCH without allocating a UL grant to make the UE operate in the half duplex mode.

Embodiment 4-6

When the SIC success flag corresponds to 0, it is able to toggle a new data indicator to transmit a new data to a UE. In order to make a packet, which is retransmitted due to the failure of self-interference cancellation of the UE, to be robust, the new data indicator is toggled via DCI when retransmission is performed. By doing so, it is able to discard a previously failed packet and receive new data.

Embodiment 5

When a base station receives a resource index (e.g., RBG index, PRB index, sub-band index) at which self-interference cancellation of a UE has been succeeded, in order to make a packet, which is retransmitted due to the failure of self-interference cancellation of the UE, to be robust, the base station can perform an operation different from a legacy HARQ procedure. In order to make a packet, which is retransmitted due to the failure of self-interference cancellation of the UE, to be robust, similar to the embodiment 2, the base station may change the HARQ procedure using embodiments 5-1 to 5-6 described in the following to make a packet transmitted to the UE cancel self-interference well by utilizing the resource index (e.g., RBG index, PRB index, sub-band index) received from the UE.

Embodiment 5-1

A base station can perform retransmission using a chase combining scheme in consideration of information on a resource index (e.g., RBG index, PRB index, sub-band index) preferred by a UE. In order to make a packet, which is retransmitted due to the failure of self-interference cancellation of the UE, to be robust, the base station performs resource allocation in consideration of the information on the resource index and can perform retransmission. The base station can transmit the packet using a chase combining (CC) scheme rather than an IR scheme that changes an RV value at the time of retransmission.

Embodiment 5-2

A base station forcibly configures an RV value by a previously transmitted value (RV=0) in consideration of information on a resource index (e.g., RBG index, PRB index, sub-band index) preferred by a UE and can transmit the value via DCI. In order to make a packet, which is retransmitted due to the failure of self-interference cancellation of a UE, to be robust, the base station performs resource allocation in consideration of the information on the resource index (e.g., RBG index, PRB index, sub-band index) preferred by the UE and can perform retransmission. The base station may forcibly covert an RV value into 0 from 2 via DCI at the time of retransmission and can retransmit the converted RV value to the UE. The UE combines an initially received packet (RV=0) with a retransmitted packet (RV=0) and then performs decoding. If the UE fails to perform decoding, the UE discards the previously failed packet and may be able to perform decoding using the retransmitted packet (RV=0) only.

Embodiment 5-3

A base station adjusts an MCS level, forcibly configures an RV value by a previously transmitted value (RV=0) in consideration of information on a resource index (e.g., RBG index, PRB index, sub-band index) preferred by a UE, and can transmit the RV value via DCI. In order to make the UE easily perform decoding using a retransmitted packet (RV=0) mentioned earlier in the embodiment 4-2 only, the base station can perform retransmission by performing resource allocation in consideration of a resource index (e.g., RBG index, PRB index, sub-band index). When the retransmission is performed, the retransmission can be performed by adjusting the MCS level.

Embodiment 5-4

As mentioned earlier in FIG. 18, a base station allocates an RV value, which is changed by a packet size capable of performing decoding using a retransmission packet only, and a PRB for performing retransmission in consideration of a resource index (e.g., RBG index, PRB index, sub-band index) preferred by a UE and can transmit the RV value and the PRB to the UE via DCI. In order to make a packet, which is retransmitted due to the failure of self-interference cancellation of the UE, to be robust, the base station performs resource allocation in consideration of the information on the resource index (e.g., RBG index, PRB index, sub-band index) preferred by the UE and can perform retransmission.

The base station can perform retransmission by allocating a PRB capable of performing decoding using a retransmission packet only. In this case, the UE performs joint decoding on an initially received packet (RV=0) and a retransmitted packet (RV=2). If the UE fails to perform decoding, the UE discards the previously failed packet and can perform decoding using the retransmitted packet (RV=2) only.

Embodiment 5-5

A base station is able to configure a UE to operate in half duplex mode in consideration of information on a resource index (e.g., RBG index, PRB index, sub-band index) preferred by the UE. In order to make a packet, which is retransmitted due to the failure of self-interference cancellation of the UE, to be robust, the base station performs resource allocation in consideration of the information on the resource index (e.g., RBG index, PRB index, sub-band index) preferred by the UE and can perform retransmission. It is able to configure the UE to operate in the half duplex mode to prevent self-interference when the UE receives retransmission. To this end, the base station can transmit a duplex mode indicator indicating the UE to operate in half duplex mode to the UE via PDCCH. Or, the base station may allocate a DL grant only to PDCCH without allocating a UL grant to make the UE operate in the half duplex mode.

Embodiment 5-6

A base station is able to transmit a new data indicator in consideration of information on a resource index (e.g., RBG index, PRB index, sub-band index) preferred by a UE by toggling the indicator to transmit a new data to the UE. In order to make a packet, which is retransmitted due to the failure of self-interference cancellation of the UE, to be robust, the new data indicator is toggled via DCI when retransmission is performed. By doing so, it is able to make the UE discard a previously failed packet and receive new data.

Embodiment 6

When a base station receives a preferred MCS level from a UE, in order to make a packet, which is retransmitted due to the failure of self-interference cancellation of the UE, to be robust, the base station can perform an operation different from legacy HARQ procedures. In order to make a packet, which is retransmitted due to the failure of self-interference cancellation of the UE, to be robust, similar to the embodiment 3, the base station may change the HARQ procedure using embodiments 6-1 to 6-6 described in the following to make a packet transmitted to the UE cancel self-interference well based on preferred MCS index information received from the UP.

Embodiment 6-1

A base station can perform retransmission by applying a chase combining scheme when the base station receives a preferred MCS level from a UE. In order to make a packet, which is retransmitted due to the failure of self-interference cancellation of the UP, to be robust, the base station performs retransmission using an MCS index preferred by the UE. The base station can perform retransmission using a chase combining, (CC) scheme rather than an IR scheme that changes an RV value at the time of retransmission.

Embodiment 6-2

When a base station receives a preferred MCS level from a UP, the base station forcibly configures an RV value by a previously transmitted value (RV=0) and can transmit the value via DCI. In order to make a packet, which is retransmitted due to the failure of self-interference cancellation of a UE, to be robust, the base station performs retransmission based on an MCS index preferred by the UE. The base station may forcibly covert an RV value into 0 from 2 via DCI at the time of retransmission and can retransmit a packet to the UE. The UE combines an initially received packet (RV=0) with a retransmitted packet (RV=0) and then performs decoding. If the UE fails to perform decoding, the UE discards the previously failed packet and may be able to perform decoding using the retransmitted packet (RV=0) only.

Embodiment 6-3

When a base station receives a preferred MCS level from a UE, the base station can transmit an MCS index value adjusted by adjusting an MCS level and an RV value (RV=0) forcibly configured by a previously transmitted value to the UE via DCI. In order to make the UE easily perform decoding using a retransmitted packet (RV=0) mentioned earlier in the embodiment 4-2 only, the base station can perform retransmission by adjusting the MCS level with an MCS index preferred by the UE.

Embodiment 6-4

As mentioned earlier in FIG. 18, when a base station receives a preferred MCS level from a UE, the base station allocates an RV value, which is changed by a packet size capable of performing decoding using a retransmission packet only, and a PRB for performing retransmission and can transmit the RV value and the PRB to the UE via DCI. In order to make a packet, which is retransmitted due to the failure of self-interference cancellation of the UE, to be robust, the base station performs retransmission based on an MCS index preferred by the UE. The base station can perform retransmission by allocating a PRB capable of performing decoding using a retransmission packet only. In this case, the UE performs joint decoding on an initially received packet (RV=0) and a retransmitted packet (RV=2). If the UE fails to perform decoding, the UE discards the previously failed packet and can perform decoding using the retransmitted packet (RV=2) only.

Embodiment 6-5

When a base station receives a preferred MCS level from a UE, the base station is able to configure the UE to operate in half duplex mode. In order to make a packet, which is retransmitted due to the failure of self-interference cancellation of the UE, to be robust, the base station can perform packet retransmission based on an MCS index preferred by the UE. It is able to configure the UE to operate in the half duplex mode to prevent self-interference when the UE receives retransmission. To this end, the base station can inform the UE of a duplex mode via PDCCH. In particular, the base station can transmit PDCCH to which half duplex mode is set to the UE. Or, the base station may allocate a DL grant only to PDCCH without allocating a UL grant to make the UE operate in the half duplex mode.

Embodiment 6-6

When a base station receives a preferred MCS level from a UE, the base station is able to transmit a new data indicator to the UE by toggling the indicator to transmit a new data to the UE. In order to make a packet, which is retransmitted due to the failure of self-interference cancellation of the UE, to be robust, the base station performs retransmission based on an MCS index preferred by the UE. The base station toggles the new data indicator via DCI when retransmission is performed. By doing so, it is able to make the UE discard a previously failed packet and receive new data.

The base station changes HARQ procedures using a combination of the embodiments 4 to 6 to enable the UE to succeed in performing retransmission.

As described above, according to one embodiment of the present invention, when a retransmission is requested in a FDR system, it is able to increase a success rate of the retransmission by transmitting information on whether or not a UE supporting a FDR mode has canceled self-interference to a base station.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of performing a HARQ procedure in environment operating in a FDR mode and an apparatus therefor can be industrially applied to various wireless communication systems including 3GPP LTE/LTE-A, 5G system, and the like.

What is claimed is:

1. A method of performing a Hybrid Automatic Repeat request (HARD) procedure by a user equipment (UE) operating in a Full Duplex Radio (FDR) mode in a wireless communication system, the method comprising:
  receiving a downlink data signal from a base station;
  transmitting feedback information including a NACK signal to the base station in response to the downlink data signal; and
  receiving a downlink control signal including control information related to retransmitting the downlink data signal,
  wherein the feedback information further includes self-interference cancellation (SIC) related information informing whether the NACK signal is transmitted because the UE has failed in cancelling of a self-interference signal, and information on a Modulation and Coding Scheme (MCS) level preferred by the UE,
  wherein the control information includes different information based on the SIC related information, and
  wherein based on the SIC related information informing that the UE has failed in cancelling of the self-interference signal, a value of a redundancy version in the control information is configured as a previously transmitted value, an MCS index in the control information is configured as the MCS level preferred by the UE, resources capable of performing decoding using a retransmission packet only are allocated by the control information.

2. The method of claim 1, wherein the feedback information further includes information informing a sub-band, a Physical Resource Block (PRB), or a Resource Block Group (RBG) where the UE has failed in the cancelling of the self-interference signal.

3. The method of claim 1, wherein the feedback information further includes information informing a Resource Block Group (RBG) where the UE has recently succeeded in the cancelling of the self-interference signal.

4. The method of claim 1, wherein the MCS level is determined based on a strength of a residual self-interference signal after the self-interference signal is cancelled.

5. A method for performing a Hybrid Automatic Repeat request (HARD) procedure by a base station in a wireless communication system, the method comprising:
  transmitting a downlink data signal to a user equipment (UE) operating in a Full Duplex Radio (FDR) mode;
  receiving feedback information including a NACK signal for the downlink data signal from the UE; and
  transmitting a downlink control signal including control information related to retransmitting the downlink data signal,
  wherein the feedback information further includes self-interference cancellation (SIC) related information informing whether the NACK signal is transmitted because the UE has failed in cancelling of a self-interference signal, and information on a Modulation and Coding Scheme (MCS) level preferred by the UE,
  wherein the control information includes different information based on the SIC related information, and
  wherein based on the SIC related information informing that the UE has failed in cancelling of the self-interference signal, a value of a redundancy version in the control information is configured as a previously transmitted value, an MCS index in the control information is configured as the MCS level preferred by the UE, resources capable of performing decoding using a retransmission packet only are allocated by the control information.

6. The method of claim 5, further comprising:
  retransmitting the downlink data signal to the UE based on the downlink control signal,
  wherein the downlink control signal includes information informing that a chase combining scheme is applied to the retransmitted downlink data signal.

7. The method of claim 5, wherein the downlink control information includes information informing the UE to operate in a half-duplex mode to the UE based on the feedback information.

8. The method of claim 5, wherein the downlink control information informs the UE to discard the downlink data signal and receive new data to the UE based on the feedback information.

9. A user equipment (UE) for performing a Hybrid Automatic Repeat request (HARD) procedure in a Full Duplex Radio (FDR) mode in a wireless communication system, the method comprising:
 a receiver;
 a transmitter; and
 a processor,
 wherein the processor is configured to control:
 the receiver to receive a downlink data signal from a base station;
 the transmitter to transmit feedback information including a NACK signal to the base station in response to the downlink data signal; and
 the receiver to receive a downlink control signal including control information related to retransmitting the downlink data signal,
 wherein the feedback information further includes self-interference cancellation (SIC) related information informing whether the NACK signal is transmitted because the UE has failed in cancelling of a self-interference signal, and information on a Modulation and Coding Scheme (MCS) level preferred by the UE,
 wherein the control information includes different information based on the SIC related information, and
 wherein based on the SIC related information informing that the UE has failed in cancelling of the self-interference signal, a value of a redundancy version in the control information is configured as a previously transmitted value, an MCS index in the control information is configured as the MCS level preferred by the UE, resources capable of performing decoding using a retransmission packet only are allocated by the control information.

10. A base station for performing a Hybrid Automatic Repeat request (HARD) procedure in a wireless communication system supporting a Frequency Duplex Radio (FDR) mode, the base station comprising:
 a transmitter;
 a receiver; and
 a processor,
 wherein the processor is configured to control:
 the transmitter to transmit a downlink data signal to a user equipment (UE) operating in a Full Duplex Radio (FDR) mode;
 the receiver to receive feedback information including a NACK signal for the downlink data signal from the UE; and
 the transmitter to transmit a downlink control signal including control information related to retransmitting the downlink data signal,
 wherein the feedback information further includes self-interference cancellation (SIC) related information informing whether the NACK signal is transmitted because the UE has failed in cancelling of a self-interference signal, and information on a Modulation and Coding Scheme (MCS) level preferred by the UE,
 wherein the control information includes different information based on the SIC related information, and
 wherein based on the SIC related information informing that the UE has failed in cancelling of the self-interference signal, a value of a redundancy version in the control information is configured as a previously transmitted value, an MCS index in the control information is configured as the MCS level preferred by the UE, resources capable of performing decoding using a retransmission packet only are allocated by the control information.

\* \* \* \* \*